(12) United States Patent
Fan

(10) Patent No.: US 9,985,841 B2
(45) Date of Patent: May 29, 2018

(54) METHOD FOR NETWORK ADDRESS ALLOCATION AND NETWORK DEVICE USING THE SAME

(71) Applicant: NANNING FUGUI PRECISION INDUSTRIAL CO., LTD., Nanning (CN)

(72) Inventor: Lu Fan, Shenzhen (CN)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 32 days.

(21) Appl. No.: 15/191,549

(22) Filed: Jun. 24, 2016

(65) Prior Publication Data

US 2017/0012934 A1    Jan. 12, 2017

(30) Foreign Application Priority Data

Jul. 10, 2015 (CN) .......................... 2015 1 0405695

(51) Int. Cl.
*H04L 29/12* (2006.01)
*H04L 12/24* (2006.01)

(52) U.S. Cl.
CPC .......... *H04L 41/12* (2013.01); *H04L 61/2038* (2013.01)

(58) Field of Classification Search
CPC ............................ H04L 41/12; H04L 61/2038
See application file for complete search history.

(56) References Cited

U.S. PATENT DOCUMENTS

2010/0214979 A1* 8/2010 Kuehnel ................. H04L 41/00
370/328
2016/0380967 A1* 12/2016 Moore ................ H04L 65/1069
709/217

FOREIGN PATENT DOCUMENTS

| CN | 1728725 A | 2/2006 |
|---|---|---|
| CN | 1963759 A | 5/2007 |
| CN | 101355469 A | 1/2009 |
| CN | 101536472 | 9/2009 |
| CN | 102792661 A | 11/2012 |
| TW | 200945826 | 11/2009 |

* cited by examiner

*Primary Examiner* — Nicholas Taylor
*Assistant Examiner* — Afroza Sultana
(74) *Attorney, Agent, or Firm* — ScienBiziP, P.C.

(57) ABSTRACT

The present disclosure recites a network address allocation method which including steps: calculating a preset number Npre of the addresses of the network according to a number L of layers of the network; comparing Npre with a maximum number N of the addresses of the network; calculating a maximum available number Cmax of the sub-nodes of each node and a maximum number NA of the network address to be allocated in the network according to the compare result of the Npre and the N; calculating the addresses Cskip(i) of the nodes of the layer i to be allocated according to Cmax and NA, wherein i is in the range of 1~L; allocating Cskip(i) to each node of the layer i of the network. The present disclosure also provides a Network device for Network address allocation.

13 Claims, 3 Drawing Sheets

METHOD FOR NETWORK ADDRESS ALLOCATION AND NETWORK DEVICE USING THE SAME

CROSS-REFERENCE TO RELATED APPLICATIONS

This application claims priority to Chinese Patent Application No. 201510405695.6 filed on Jul. 10, 2015, the contents of which are incorporated by reference herein.

FIELD

The subject matter herein generally relates to network address allocation.

BACKGROUND

Generally, network addresses are distributed to network nodes based on a Cluster-Tree algorithm and, however, are unable to meet too many network nodes. When a new node is added to a network topology that the number of required network addresses is greater than the maximum number of allocatable network, the network topology must be re-arranged via the root node thereof to re-allocate the network addresses. Moreover, when a node adds to the network topology, at this time a candidate parent node of the node cannot provide extra addresses, the candidate parent node needs to ask his parent node whether there are available addresses to be assigned to the added node. If the extra addressed cannot be provided, the parent node have to ask other parent nodes at upper layers matched addresses.

BRIEF DESCRIPTION OF THE DRAWINGS

Implementations of the present technology will now be described, by way of example only, with reference to the attached figures, wherein.

DETAILED DESCRIPTION

Figure 1:
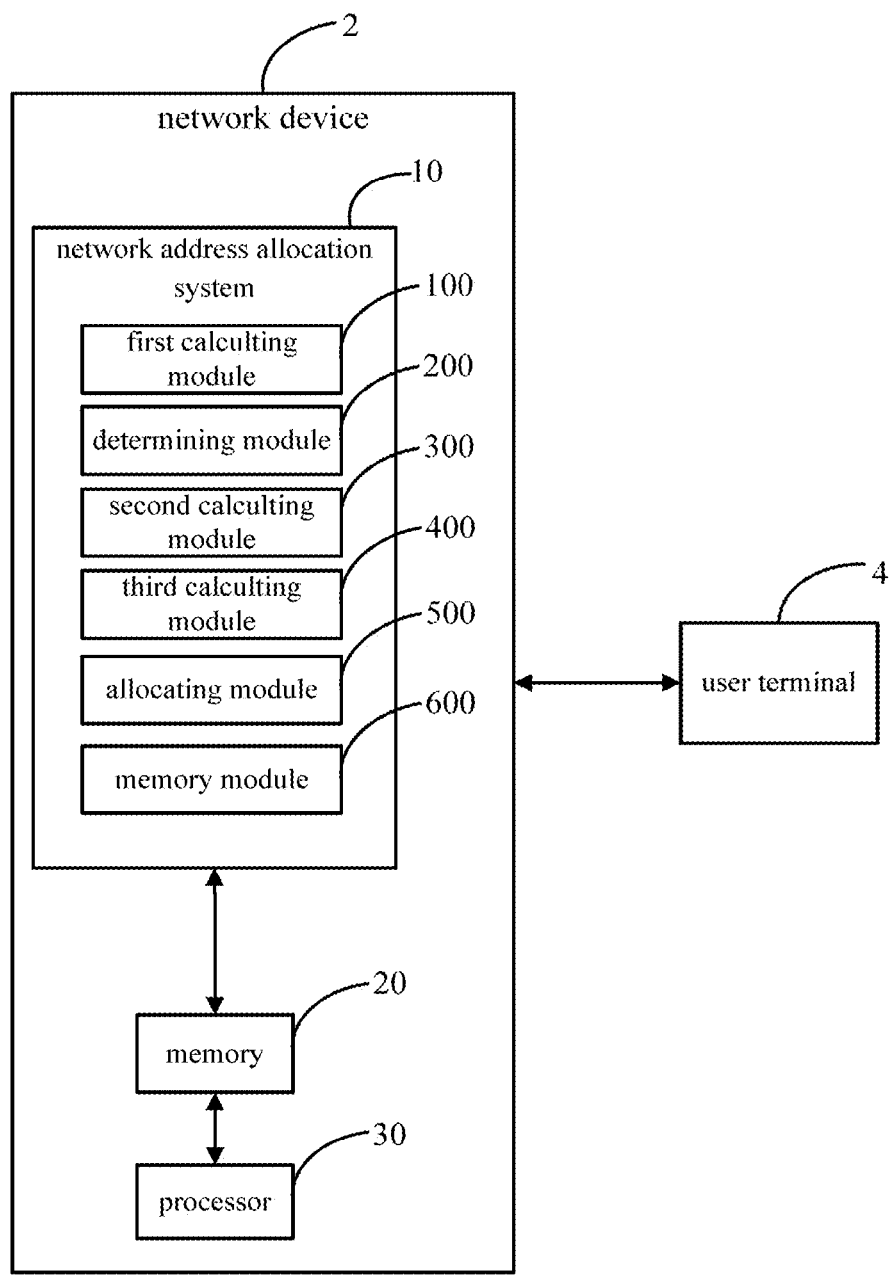
FIG. 1 illustrates a block diagram of a network device according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a block diagram of a network device according to an embodiment of the disclosure. In the embodiment, a network device 2 includes a network address allocation system 10, a memory 20 and a processor 30. The network device 2 can be a gateway, a switch, a router, a server etc. The network device 2 connects to one or more user terminal 4 via wire or wireless. The network address allocation system 10 creates a network topology and allocates a network address to the user terminal 4.

The network address allocation system 10 includes a first calculating module 100, a determining module 200, a second calculating module 300, a third calculating module 400, a allocating module 500 and a memory module 600. The module is configured to be executed by one or more processors (the embodiment of the processor 30) to complete the invention. The module of the disclosure is the computer programs to complete a specific function. This memory 20 stores the program and other information of the network address allocation system 10.

The first calculating module 100 calculates N according to M, and $N=2^M-1$, wherein N is the maximum number of the available network addresses in the network and M is the number of the bits of the address of the node in the network. In the embodiment, the number of the layers of the network is L, and a preset maximum number of sub-nodes of each node in the network is Cpre and a preset number of network addresses to be allocated is Npre. The calculating module 100 calculates Cpre according to N and L, and $$C_{pre} = \left[ N^{\frac{1}{L}} \right],$$

then calculates Npre according to Cpre of each layers in the network, and $C_{pre}^L + C_{pre}^{L-1} + C_{pre}^{L-2} + \ldots C_{pre} = N_{pre}$.

The determining module 200 compares Npre with N, wherein N is the maximum number of the available network addresses in the network. Then the second calculating module 300 calculates Cmax and NA according to the compare result of the determining module 200, wherein Cmax is a maximum number of the available sub-nodes for each node and NA is a actual number of the network addresses to be allocated in the network.

In the embodiment, when the determining module 200 has judged Npre is less than N, it means that Cpre is available, otherwise it means that Cpre is not available and Cpre should to perform a 1 reduction. Specifically, when the determining module 200 has judged Npre≤N, the second calculating module 300 calculates the Cmax and NA with the formulas Cmax=Cpre and NA=Npre. Otherwise, the second calculating module 300 calculates Cmax and NA with the formulas Cmax=Cpre−1 and $N_A=C_{max}^L+C_{max}^{L-1}+C_{max}^{L-2}+\ldots C_{max}$.

The Table 1 shows the different values of Cmax, NA and Nrest in the different values of L in a network with 16 bits address of the node (M=16), wherein Nrest is the remaining non-allocated addresses of N.

TABLE 1

| L | Cmax | NA | Nrest |
|---|------|-------|-------|
| 1 | 65535 | 65535 | 0 |
| 2 | 255 | 65280 | 255 |
| 3 | 39 | 60879 | 4656 |
| 4 | 15 | 54240 | 11295 |
| 5 | 8 | 37448 | 28087 |
| 6 | 6 | 55986 | 9549 |

As shown in Table 1, when L is 3, the first calculating module 100 calculates $N=2^M-1=2^{16}-1$, and N=65535, then calculates Cpre and Npre according to the formulas $$C_{pre} = [N^{\frac{1}{L}}]$$

and $C_{pre}^L+C_{pre}^{L-1}+C_{pre}^{L-2}+\ldots C_{pre}=N_{pre}$, and Cpre=40, Npre=65640. The second calculating module 300 calculates Cmax=39 and NA=60879 according to the formulas Cmax=Cpre−1 and $N_A=C_{max}^L+C_{max}^{L-1}+C_{max}^{L-2}+\ldots C_{max}$ after the determining module 200 had judged that Npre is not less than N.

In the embodiment, the parent nodes of each layer allocate the addresses to the corresponding sub-nodes on average according to Cmax in the network. As the parent node of the nodes of first layer, the root node allocates NA to the node of the first layer, and the number of the sub-nodes of the nodes of the first layer as the same as other layers and the value is Cmax. Then the nodes in the first layer allocate the addresses that allocated by the root node and had subtracted by 1 to the sub-nodes of the first layer. The parent nodes of each layer allocate the addresses to the corresponding sub-nodes on average according to Cmax by this way until the nodes of the last layer of the network have been allocated addresses.

In the embodiment, the third calculating module 400 calculates Cskip(i) according to a preset formula and Cmax and NA calculated by the second calculating module 300, wherein Cskip(i) is the number of addresses of each node in layer i of the network to be allocated, and the preset formula is $$C_{skip}(i) = \begin{cases} \dfrac{N_A}{C_{max}} & i=1 \\ \dfrac{N_A - C_{max}^{i-1} - C_{max}^{i-2} \ldots C_{max}^1}{C_{max}^i} & i>1 \end{cases},$$

wherein i is in the range of 1~L. Then the allocating module 500 allocates Cskip(i) from the parent node of the node of layer i to the nodes of layer i, and allocates Cskip(i+1) from the node of the layer i to the sub-nodes of the node of the layer i, wherein, the root node is the parent node of the first layer nodes, and the addresses to be allocated is NA.

Figure 2:
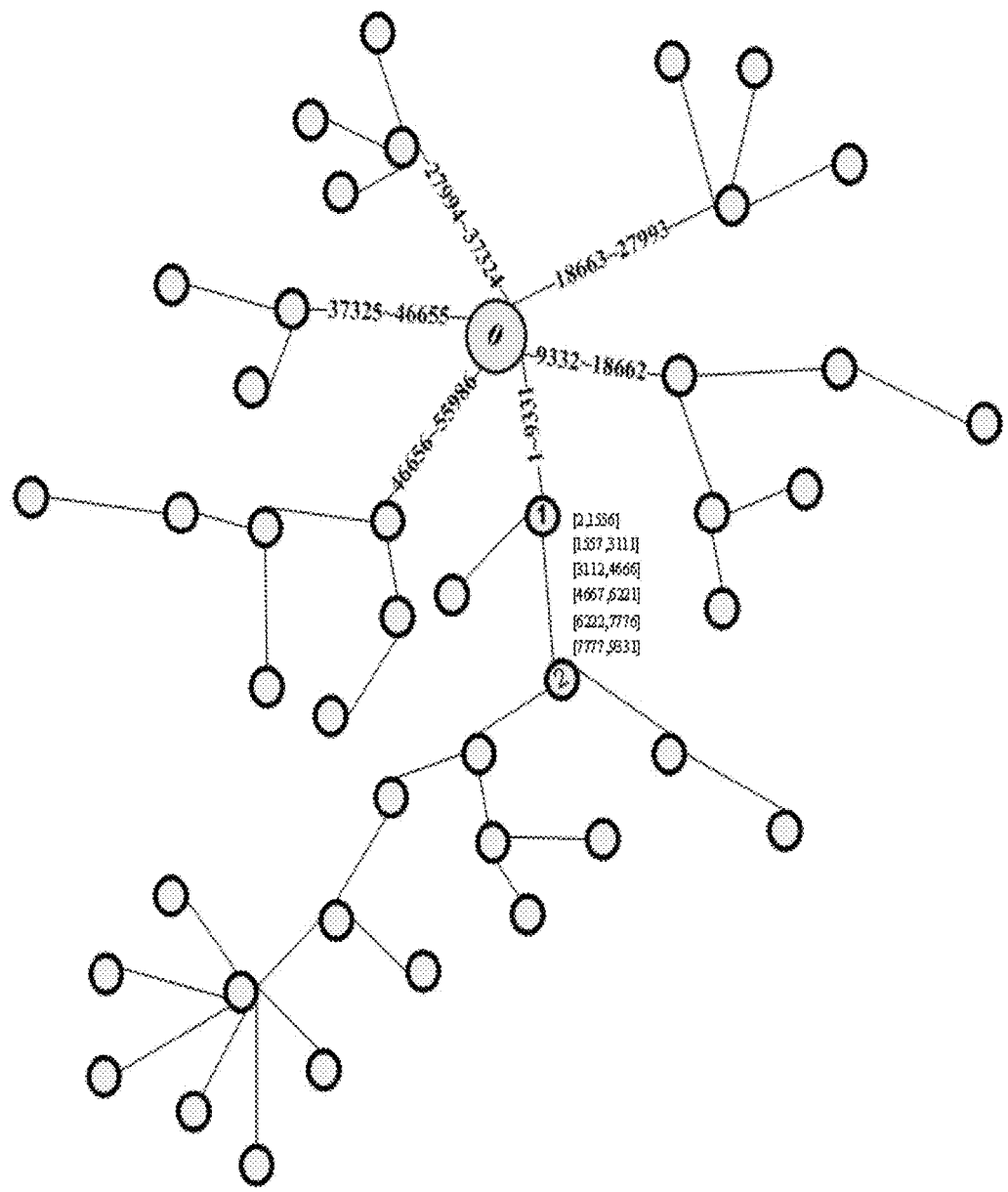
FIG. 2 illustrates a schematic diagram of an embodiment of network address allocation of the network device in FIG. 1.

FIG. 2 illustrates an example diagram of an embodiment of the network address allocation of the network device in FIG. 1. In the embodiment, the bit of the address of the node in the network is 16 bits (M=16), and the layer of the network is 6 (L=6). The second calculating module 300 calculates Cmax=6 and NA=55986. Then the third calculating module 400 calculates the number of the addresses of each layers from the first layer to the sixth layer according to Cmax and NA and the formula $$C_{skip}(i) = \begin{cases} \dfrac{N_A}{C_{max}} & i=1 \\ \dfrac{N_A - C_{max}^{i-1} - C_{max}^{i-2} \ldots C_{max}^1}{C_{max}^i} & i>1 \end{cases}, \text{ and }$$

$$C_{skip}(1) = \dfrac{N_A}{C_{max}} = \dfrac{55986}{6} = 9331,$$

$$C_{skip}(2) = \left(\dfrac{N_A}{C_{max}} - 1\right)\dfrac{1}{C_{max}} = \dfrac{N_A - C_{max}}{C_{max}^2} = (9331-1)\dfrac{1}{6} = 1555,$$

Cskip(3)=259, Cskip(4)=43, Cskip(5)=7, Cskip(6)=1.

Therefore, the allocating module 500 allocates NA to the nodes of the first layer with 9331 addresses, and then allocates the 9331 addresses to the nodes of the second layer with 1555 addresses, and allocates the addresses to each node in the network in turn by this way until the last layer. The remaining non-allocated addresses of Cskip(i) are stored in the memory module 600 and kept by the nodes of layer i for further allocation.

In the illustrated embodiment, the allocating module 500 allocates the 9331 addresses of the node of the first layer to the nodes of the second layer with 1555 addresses, And the nodes of the second layer is only 3, so that the allocating module 500 allocates 3*1555=1665 address to the 3 nodes. The remaining non-allocated addresses is 9331−4665=4666, these addresses stored in the memory module 600 for further allocation. The memory module 600 also stores Nrest. In this illustrated embodiment, the first calculating module calculates $N=2^{16}-1=65535$, and the second calculating module calculates NA=66+65+64+ . . . +6=55986, then the third calculating module calculates Nrest=65535−55986=9549. The Nrest is stored in the memory module 600 and kept by the root node for further allocation.

Figure 3:
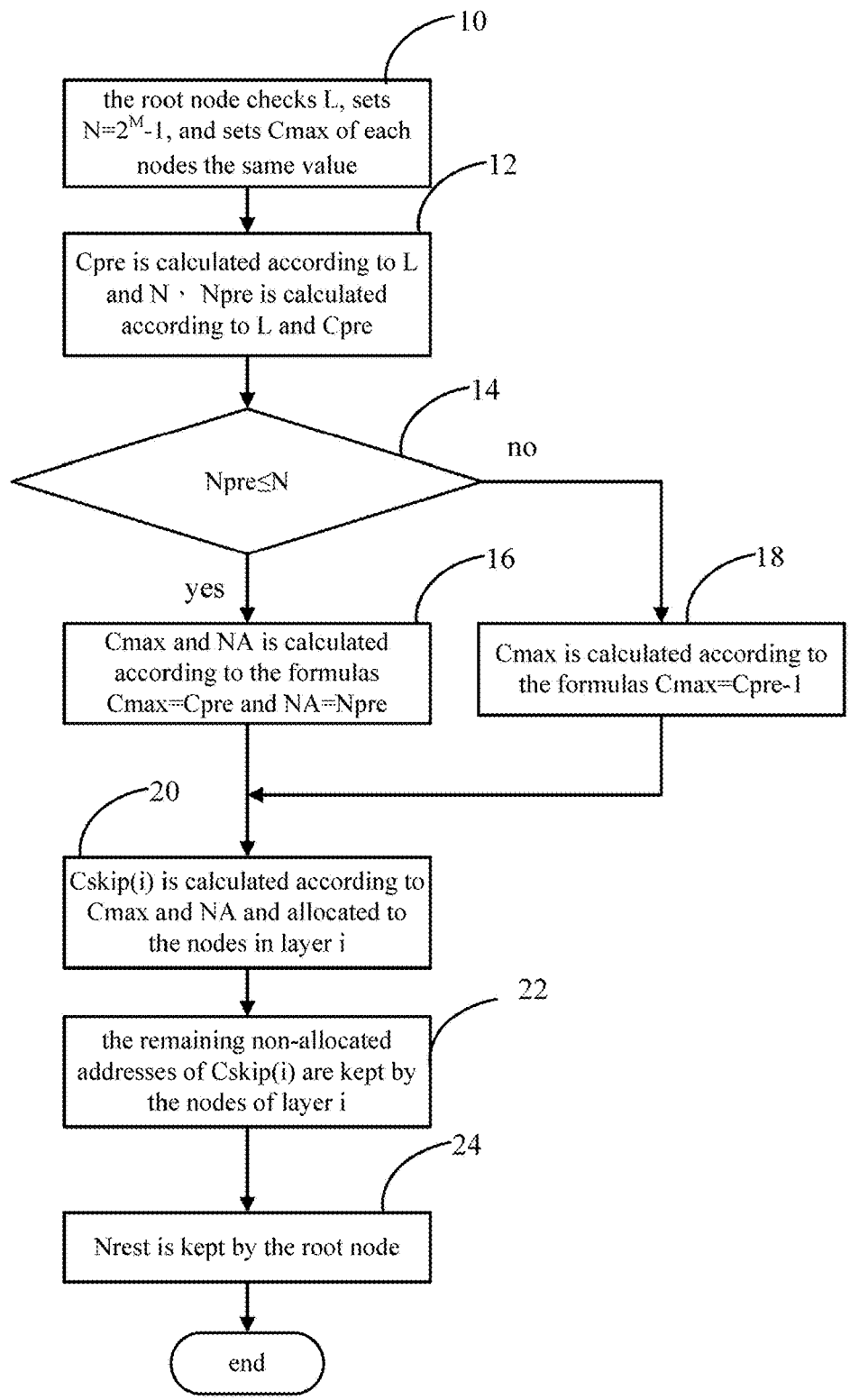
FIG. 3 illustrates a flowchart of a method for network address allocation according to an embodiment of the disclosure.

FIG. 3 illustrates a flowchart of a method for network address allocation according to an embodiment of the disclosure. The allocation method applied on the network device 2 and executed by executing the program code stored in the memory 20, and the program code is executed by the processor 30.

At block 10, the root node checks L, sets $N=2^M-1$, and sets Cmax of each node the same value.

At block 12, Cpre is calculated according to L and N, and $$C_{pre} = [N^{\frac{1}{L}}],$$

and then Npre is calculated according to L and Cpre, and $C_{pre}^L+C_{pre}^{L-1}+C_{pre}^{L-2}+\ldots C_{pre}=N_{pre}$.

At block 14, Npre is compared with N. The process proceeds to block 16 when Npre≤N, and proceeds to block 18 when Npre>N.

At block 16, it means that Cpre is available when Npre≤N, then Cmax and NA is calculated according to the formulas Cmax=Cpre and NA=Npre.

At block 18, it means that Cpre is not available when Npre>N, so Cpre needs to performed a 1 reduction, and then Cmax and NA is calculated according to the formulas Cmax=Cpre-1 and $N_A = C_{max}^L + C_{max}^{L-1} + C_{max}^{L-2} + \ldots C_{max}$.

At block 20, Cskip(i) is calculated according to Cmax and NA obtained at block 16 (or block 18), and $$C_{skip}(i) = \begin{cases} \dfrac{N_A}{C_{max}} & i = 1 \\ \dfrac{N_A - C_{max}^{i-1} - C_{max}^{i-2} \ldots C_{max}^1}{C_{max}^i} & i > 1 \end{cases}$$

wherein i is in the range of 1~L. Then Cskip(i) is allocated to the nodes in layer i of the network by the parent nodes of the nodes in layer i, and Cskip(i+1) is allocated from Cskip(i) to the nodes in layer i+1 by the nodes in layer i.

At block 22, the remaining non-allocated addresses of Cskip(i) are stored by the nodes of layer i for further allocation.

At block 24, Nrest is stored by the root node for further allocation.

The detailed description above is the introduction of the present disclosure of a network device and method for network address allocation. Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for network addresses allocation, comprising:
   calculating Npre according to L, wherein Npre is a preset address number of a network topology for allocation and L is a number of layers of the network topology;
   comparing Npre and N, wherein N is a maximum number of the available network addresses in the network;
   calculating Cmax and NA according to the comparison result of Npre and N, wherein Cmax is a maximum number of available sub-nodes for each node, and NA is an actual number of network addresses to be allocated in the network;
   calculating Cskip(i) according to Cmax and NA, wherein Cskip(i) is an addresses of each node in layer i of the network to be allocated, wherein i is in the range of 1~L;
   allocating the network addresses of the parent nodes to each node in layer i of the network according to Cskip(i).

2. The method as claimed in claim 1, wherein calculating N according to M is performed using a calculation formula: $N=2^M-1$, where M is a number of the bits of the address of the node in the network.

3. The method as claimed in claim 1, wherein calculating Npre according to L comprises:
   calculating Cpre according to L and N, and $$C_{pre} = \left[ N^{\frac{1}{L}} \right],$$

wherein Cpre is a maximum number of sub-nodes of each node in the network;

calculating Npre according to L and Cpre, and $C_{pre}^L + C_{pre}^{L-1} + C_{pre}^{L-2} + \ldots C_{pre} = N_{pre}$.

4. The method as claimed in claim 1, wherein calculating Cmax and NA according to the comparison result of Npre and N comprises:
   calculating Cmax=Cpre, and NA=Npre when Npre≤N;
   calculating Cmax=Cpre-1, and $N_A = C_{max}^L + C_{max}^{L-1} + C_{max}^{L-2} + \ldots C_{max}$ when Npre>N.

5. The method as claimed in claim 1, wherein calculating Cskip(i) according to Cmax and NA is performed using a calculation formula:

$$C_{skip}(i) = \begin{cases} \dfrac{N_A}{C_{max}} & i = 1 \\ \dfrac{N_A - C_{max}^{i-1} - C_{max}^{i-2} \ldots C_{max}^1}{C_{max}^i} & i > 1 \end{cases}.$$

6. The method as claimed in claim 1, wherein allocating the network addresses of the parent nodes to each node in layer i of the network according to Cskip(i) comprises:
   allocating Cskip(i+1) to each node in layer i+1 from Cskip(i) by the node in layer i, wherein Cskip(i+1) is the addresses of each node in layer i+1 to be allocated; and
   allocating Cskip(1) to each node in layer 1 from NA by the root node;
   keeping the non-allocated addresses of Cskip(i) by the nodes in layer i.

7. The method as claimed in claim 1, further comprises:
   keeping Nrest by the root node in the network, wherein Nrest is the remaining non allocated addresses, and Nrest=N–NA.

8. A network device for network addresses allocation, comprising:
   at least one processor;
   a non-transitory storage system coupled to the at least one processor and configured to store one or more programs that are executed by the at least one processor, the one or more programs including instructions for:
   calculating Npre according to L, wherein Npre is a preset number addresses of a network topology for allocation and L is a number of layers of the network topology;
   comparing Npre and N, wherein N is a maximum number of the available network addresses in the network;
   calculating Cmax and NA according to the comparison result of Npre and N, wherein Cmax is a maximum number of a available sub-nodes for each node, and NA is an actual number of a network addresses to be allocated in the network;
   calculating Cskip(i) according to Cmax and NA, wherein Cskip(i) is an addresses of each node in layer i of the network to be allocated, wherein i is in the range of 1~L;
   allocating the network addresses of the parent node to each node in layer i of the network according to Cskip(i).

9. The network device of claim 8, wherein the one or more programs further include instructions for:
   calculating N according to M follows the calculation formula: $N=2^M-1$, where M is a number of the bits of the address of the node;
   calculating Cpre according to L and N, and $$C_{pre} = \left[ N^{\frac{1}{L}} \right],$$

wherein Cpre is a maximum number of sub-nodes of each node in the network;

calculating Npre according to L and Cpre, and $C_{pre}^{L}+C_{pre}^{L-1}+C_{pre}^{L-2}+\ldots C_{pre}=N_{pre}$.

10. The network device of claim 8, wherein the one or more programs further include instructions for:

calculating Cmax=Cpre, and NA=Npre when Npre≤N;

calculating Cmax=Cpre−1, and $N_A=C_{max}^{L}+C_{max}^{L-1}+C_{max}^{L-2}+\ldots C_{max}$ when Npre>N.

11. The network device of claim 8, wherein the one or more programs further include instructions for:

calculating Cskip(i) according to Cmax and NA, and $$C_{skip}(i) = \begin{cases} \dfrac{N_A}{C_{max}} & i=1 \\ \dfrac{N_A - C_{max}^{i-1} - C_{max}^{i-2} \ldots C_{max}^{1}}{C_{max}^{i}} & i>1 \end{cases}.$$

12. The network device of claim 8, wherein the one or more programs further include instructions for:

allocating Cskip(i+1) to each node in layer i+1 from Cskip(i) by the node in layer i, wherein Cskip(i+1) is the addresses of each node in layer i+1 to be allocated; and allocating Cskip(1) to each node in layer 1 from NA by the root node.

13. The network device of claim 8, wherein the one or more programs further include instructions for:

keeping the non-allocated addresses of Cskip(i) by the nodes in layer i;

keeping Nrest by the root node in the network, wherein Nrest is the remaining non allocated addresses, and Nrest=N−NA.

* * * * *